United States Patent
Murakami et al.

(10) Patent No.: US 11,787,362 B2
(45) Date of Patent: Oct. 17, 2023

(54) AIRBAG MODULE

(71) Applicants: Autoliv Development AB, Vargarda (SE); Sho Murakami, Kanagawa (JP); Masaru Habu, Kanagawa (JP)

(72) Inventors: Sho Murakami, Kanagawa (JP); Masaru Habu, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/756,292

(22) PCT Filed: Oct. 13, 2020

(86) PCT No.: PCT/JP2020/038624
§ 371 (c)(1),
(2) Date: May 20, 2022

(87) PCT Pub. No.: WO2021/106396
PCT Pub. Date: Jun. 3, 2021

(65) Prior Publication Data
US 2022/0402454 A1    Dec. 22, 2022

(30) Foreign Application Priority Data
Nov. 25, 2019 (JP) .................................. 2019-211955

(51) Int. Cl.
*B60R 21/217* (2011.01)
*B60R 21/23* (2006.01)

(52) U.S. Cl.
CPC ............ *B60R 21/217* (2013.01); *B60R 21/23* (2013.01)

(58) Field of Classification Search
None
See application file for complete search history.

(56) References Cited

U.S. PATENT DOCUMENTS 5,306,042 A * 4/1994 Frank .................... B60R 21/216
  280/732
5,344,184 A * 9/1994 Keeler ................ B60R 21/2155
  280/732
(Continued)

FOREIGN PATENT DOCUMENTS

CN        1671580 A      9/2005
CN     205801021 U    12/2016
(Continued)

OTHER PUBLICATIONS

First Office Action and Search Report of CN 202080074123.3 dated Apr. 11, 2023.

*Primary Examiner* — Nicole T Verley
(74) *Attorney, Agent, or Firm* — DICKINSON WRIGHT PLLC

(57) ABSTRACT

A configuration of the airbag module according to the present invention is an airbag module including an airbag cushion that is folded or wound, an inflator equipped in the airbag cushion, and a case-shaped housing where the airbag cushion is stowed. Herein, the housing includes four side walls, the upper part thereof being open; one side wall of the four side walls and two side walls positioned and connected on both sides thereof; and two extendable walls and at the opening above the four side walls that are in a folded state prior to expansion and deployment of the airbag cushion and open up when the airbag cushion expands and deploys.

8 Claims, 4 Drawing Sheets

(56) References Cited

U.S. PATENT DOCUMENTS

| | | | | |
|---|---|---|---|---|
| 5,360,231 | A * | 11/1994 | Adams | B60R 21/2165 |
| | | | | 280/732 |
| 6,161,864 | A * | 12/2000 | Heilig | B60R 21/2155 |
| | | | | 280/743.1 |
| 7,431,330 | B2 | 10/2008 | Korechika | |
| 7,841,975 | B2 | 11/2010 | Korechika | |
| 9,669,792 | B2 * | 6/2017 | Miura | B60R 21/217 |
| 11,370,381 | B1 * | 6/2022 | Mihm | B60R 21/205 |
| 2004/0004343 | A1 | 1/2004 | Pinsenschaum et al. | |
| 2004/0160047 | A1 * | 8/2004 | Marotzke | B60R 21/217 |
| | | | | 280/741 |
| 2005/0161921 | A1 * | 7/2005 | Higuchi | B60R 21/207 |
| | | | | 280/753 |
| 2005/0173899 | A1 | 8/2005 | Korechika | |
| 2012/0049497 | A1 * | 3/2012 | Enders | B60R 21/206 |
| | | | | 280/743.1 |
| 2016/0332591 | A1 | 11/2016 | Schwark | |

FOREIGN PATENT DOCUMENTS

| | | | | |
|---|---|---|---|---|
| EP | 2345562 A1 | 7/2011 | | |
| JP | H08268200 A | 10/1996 | | |
| JP | 3038153 U | 6/1997 | | |
| JP | H09315249 A | 12/1997 | | |
| JP | 11-235964 A | 8/1999 | | |
| JP | 2009-029167 A | 2/2009 | | |
| JP | 2010280253 A | 12/2010 | | |
| JP | 2015-205584 A | 11/2015 | | |
| KR | 20220109469 A * | 8/2022 | | |
| WO | WO-2021065778 A1 * | 4/2021 | | B60R 21/2334 |
| WO | WO-2021106396 A1 * | 6/2021 | | B60R 21/217 |

\* cited by examiner

A-A cross section

AIRBAG MODULE

CROSS-REFERENCE TO RELATED APPLICATIONS

This application is a 35 U.S.C. § 371 national phase of PCT International Application No. PCT/JP2020/038624, filed Oct. 13, 2020, which claims the benefit of priority under 35 U.S.C. § 119 to Japanese Patent Application No. 2019-211955, filed Nov. 25, 2019, the contents of which are incorporated herein by reference in its entirety.

FIELD

The present invention relates to an airbag module provided with a case type housing for stowing an airbag cushion.

BACKGROUND

Airbag devices have generally become standard equipment in vehicles in recent years. An airbag device is a safety device which is operated in the event of an emergency such as a vehicle collision, retaining and protecting passengers utilizing an airbag cushion which expands and deploys based on gas pressure. Prior to expansion and deployment, the airbag cushion is folded or rolled into a small, stowed form for installation in various places in a vehicle.

For example, JP 2007-203937 A discloses a knee protection airbag device including an airbag that is folded and stowed on a lower surface side of a column cover covering a steering column and an inflator that supplies inflation gas to the airbag. In the knee protection airbag device of JP 2007-203937 A, an airbag into which the expansion gas discharged from the inflator flows protrudes from the stowed site on the lower surface side of the column cover and expands and deploys so as to cover the lower surface side of the column cover. This enables protecting both knees of the driver.

SUMMARY

In an emergency, an airbag needs to rapidly expand and deploy. However, if the housing does not readily open, the expansion and deployment of the airbag will be hindered, and expanding and deploying an airbag at the desired timing will be difficult. Therefore, there has been a demand for the development of technology enabling housing to open more readily.

In light of these issues, an object of the present invention is to provide an airbag module where the housing opens readily during expansion and deployment of the airbag.

To resolve the problems described above, a typical configuration of the airbag module according to the present invention is an airbag module including an airbag cushion that is folded or wound, an inflator equipped in the airbag cushion, and a case-shaped housing where the airbag cushion is stowed, wherein the housing includes four side walls, the upper part thereof being open; one of the side walls of the four side walls and two side walls positioned and connected on both sides thereof; and two extendable walls at the opening above the four side walls that are in a folded state prior to expansion and deployment of the airbag cushion and open up when the airbag cushion expands and deploys.

According to the configuration described above, the expanding and deploying airbag cushion opens up the extendable wall and widens the opening on the upper side of the housing. As a result, the opening of the housing more readily opens when the airbag cushion is expanded and deployed. As the housing opens readily in this manner, speed of the airbag cushion deployment can be increased. As a result, the deployment behavior is stable and the occupant can be restrained more quickly, so that occupant injury value can be reduced. In addition, the housing opening readily improves resistance of internal pressure reduction of the cushion during airbag cushion deployment. Therefore, the amount of cushion base material is anticipated to be reduced and the housing plate thickness is anticipated to be reduced enabling potential cost reduction.

Each of the above two extendable walls may be folded in a bellows shape. According to such a configuration, the extendable wall can be suitably widened during expansion and deployment of the airbag cushion.

Each of the two extendable walls has a first side along the edge of the one side wall described above, a second side along the edge of one of either of the two side walls described above, and a third side connecting the first and second sides together, making a triangular shape. Even with this manner of configuration, the extendable wall can be satisfactorily expanded when the airbag cushion is expanded and deployed.

The present invention enables providing an airbag module with the housing readily capable of opening when the airbag expands and deploys.

DETAILED DESCRIPTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Embodiment 1

Figure 1:
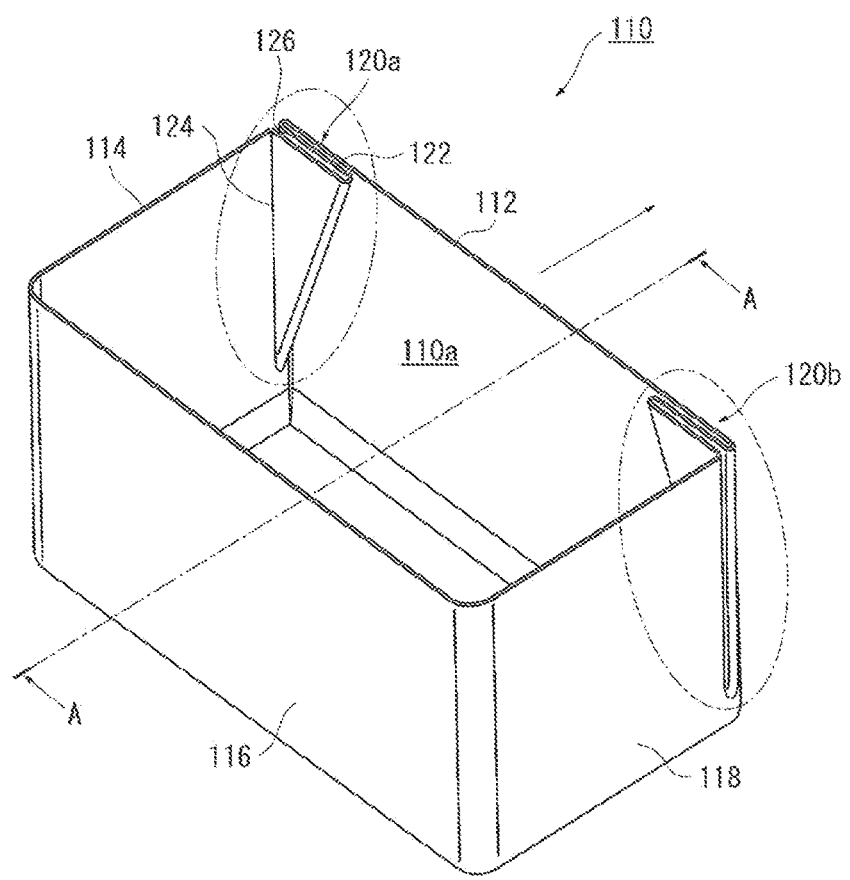
FIG. 1 is a perspective view of a housing of an airbag module according to Embodiment 1 of the present invention.
Figure 2:
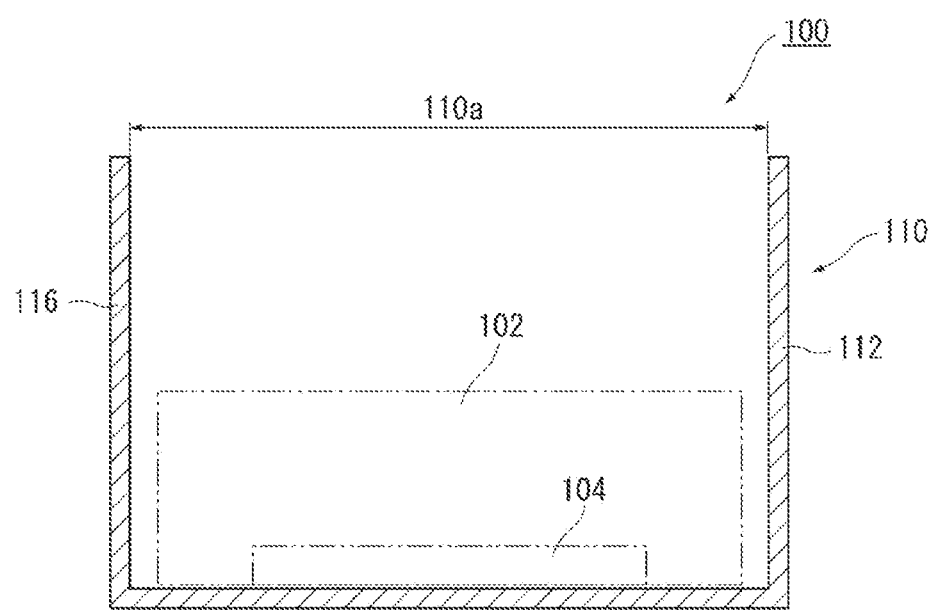
FIG. 2 is a schematic cross-sectional view taken along the straight line A-A cutaway of the housing in FIG. 1.

FIG. 1 is a perspective view of a housing 110 of an airbag module 100 according to Embodiment 1 of the present invention. FIG. 2 is a schematic cross-sectional view of a cross-section taken along the straight line A-A cutaway of the housing in FIG. 1.

Note that the airbag module 100 of the present embodiment is assumed to be used as a knee airbag device that protects the knee portion of the passenger. However, the airbag module 100 of the present embodiment is not limited thereto, and can be used as an airbag for a motorcycle.

FIG. 2 is a schematic cross-sectional view taken along the straight line A-A cutaway of the housing in FIG. 1. In FIG. 2, the airbag cushion 102 and the inflator 104, which are not shown in FIG. 1, are illustrated by dashed lines. As illustrated in FIG. 2, the airbag module 100 of Embodiment 1 includes an airbag cushion 102, an inflator 104, and a case type housing 110. The inflator 104 is provided in the airbag cushion 102. The airbag cushion 102 is stowed in the housing 110 in a folded or rolled up state.

As illustrated in FIG. 1, the housing 110 includes four side walls 112, 114, 116, 118 with an opening 110a on the upper side, and two extendable walls 120a and 120b. The two extendable walls 120a and 120b connect one side wall 112 to two side walls 114 and 118 located on both sides thereof. As illustrated in FIG. 1, the two extendable walls 120a and 120b are in a folded state before the airbag cushion 102 (see FIG. 2) expands and deploys.

Figure 3:
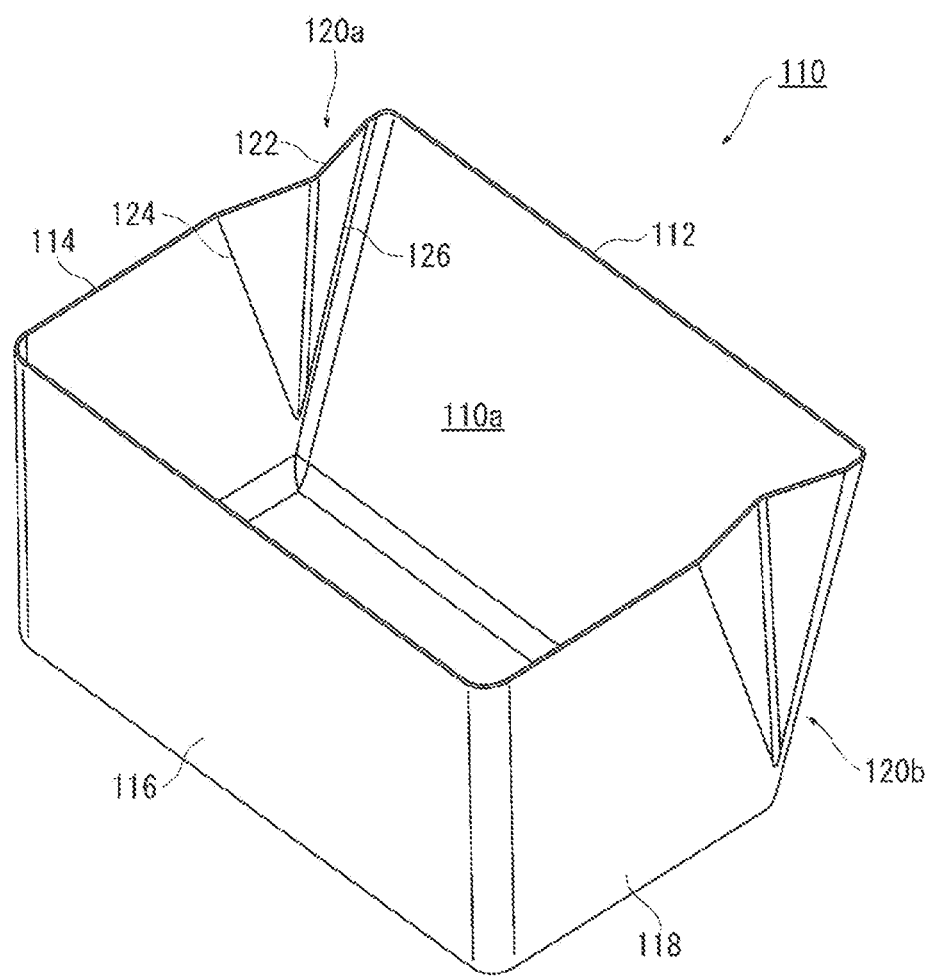
FIG. 3 is a perspective view illustrating a state in which the extendable walls of the housing of FIG. 1 open up.

FIG. 3 is a perspective view illustrating a state in which the extendable walls 120a and 120b of the housing 110 of FIG. 1 are opened up. As illustrated in FIG. 3, the two extendable walls 120a and 120b open up in this manner when the airbag cushion 102 (see FIG. 2) expands and deploys. As a result, the upper opening of the four side walls 112, 114, 116, and 118 opens up.

With the configuration described above, the opening of the housing 110 is more likely to open when the airbag cushion 102 is expanded and deployed. As the housing 110 opens readily in this manner, speed of the airbag cushion 102 deployment can be increased. As a result, the deployment behavior is stable and the occupant can be restrained more quickly, so that occupant injury value can be reduced.

In addition, the housing opening readily improves cushion resistance, reducing internal pressure during deployment of the airbag cushion 102. Therefore, the amount of cushion base material is anticipated to be reduced and the plate thickness of the housing 110 is anticipated to be reduced enabling potential cost reduction.

In particular, in the airbag module 100 of Embodiment 1, the two extendable walls 120a and 120b have a triangular shape. Since the two extendable walls 120a and 120 have symmetrical shapes, the extendable wall 120a will be used as representative of the walls and will be described in detail below. As illustrated in FIG. 3, the extendable wall 120a has a first side 126 along the edge of the side wall 112, a second side 124 along the edge of the side wall 114, and a third side 122 that connects the upper ends of the first side 126 and second side 124, composing a triangular shape.

In the configuration described above, the two extendable walls 120a and 120b have a triangular shape with a width that increases toward the top. As a result, when the two extendable walls 120a and 120b open up during the expansion and deployment of the airbag cushion 102, the opening of the housing 110 widens toward the top. This enables further increase in the deployment speed of the airbag cushion 102.

Embodiment 2

FIG. 4 is a perspective view of the housing 210 of the airbag module 200 according to embodiment 2 of the present invention. In FIG. 4, which illustrates embodiment 2, the same elements as those in embodiment 1 are designated by the same codes, and the description thereof will be omitted. The airbag module 200 also includes an airbag cushion 102 and an inflator 104 as illustrated in FIG. 2, but these are not shown in FIG. 4 and are omitted.

Figure 4A:
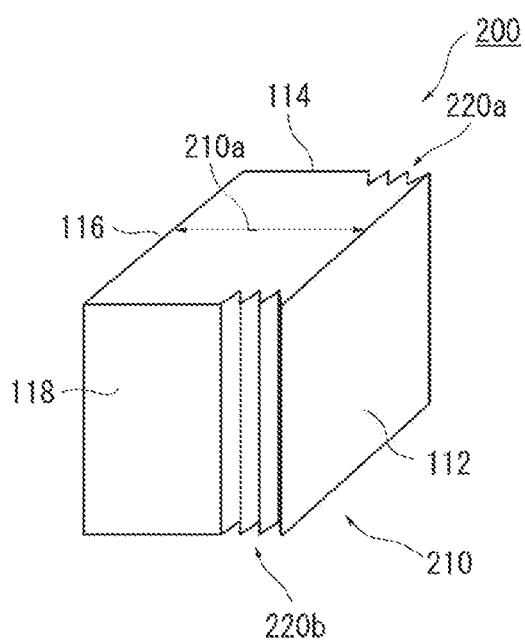
FIG. 4 is a perspective view of the housing of an airbag module according to Embodiment 2 of the present invention.
Figure 4B:
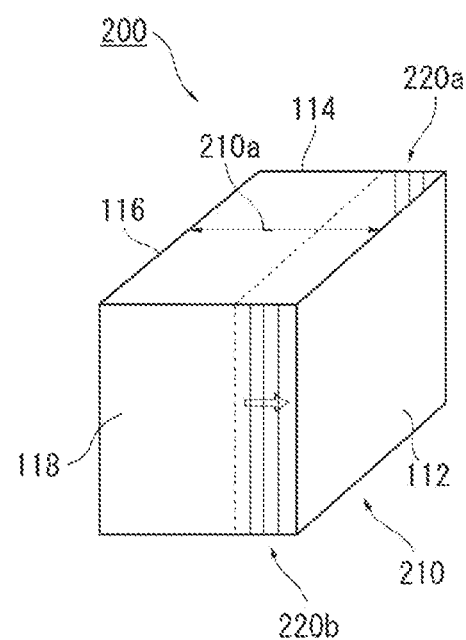

In the housing 210 illustrated in FIG. 4(a), each of the two extendable walls 220a and 220b are folded in a bellows shape. As a result, when the airbag cushion 102 expands and deploys, the bellows-shaped extendable walls 220a and 220b open up in a rectangular shape as illustrated in FIG. 4(b), and the four side walls 112, 114, 116, and 118, that is, the opening 210 on the upper end of the housing 210, opens up. Therefore, the same effect as that of the airbag module 100 of embodiment 1 can be obtained.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

The present invention can be used for an airbag module having a case-shaped housing for accommodating an airbag cushion.

While the above description constitutes the preferred embodiment of the present invention, it will be appreciated that the invention is susceptible to modification, variation and change without departing from the proper scope and fair meaning of the accompanying claims.

The invention claimed is:

1. An airbag module, comprising:
    an airbag cushion;
    an inflator provided in the airbag cushion; and
    a case-shaped housing stowing the airbag cushion, the housing including four side walls and an opening formed in an upper side; of the housing,
    wherein the housing further includes two extendable walls, and each of the two extendable walls is positioned and connected on one side wall of four side walls and two other side walls perpendicularly positioned and connected on both sides; of the one side wall,
    wherein the two extendable walls that are in a folded state prior to expansion and deployment of the airbag cushion and are in an extended state when the airbag cushion expands and deploys, and
    wherein, in the folded state of the extendable walls, the opening of the housing is opened and in the extended state of the extendable walls, a size of the opening formed in the upper side of the housing is increased.

2. The airbag module according to claim 1, wherein each of the two extendable walls is folded in a bellows shape.

3. The airbag module according to claim 1, wherein each of the two extendable walls has a first side along an edge of the one side wall, a second side along an edge of one of the two side walls, and a third side connecting upper ends of the first side and the second side such that each of the extendable walls is formed with a triangular shape.

4. The airbag module according to claim 3, wherein, in the folded state of the extendable wall sections, the two extendable wall sections are each folded in half and the folded two extendable wall sections are each faced parallelly to the one side wall.

5. An airbag module for protecting an occupant, the airbag module comprising:
   an airbag cushion;
   an inflator provided in the airbag cushion; and
   a housing stowing the airbag cushion with the inflator, the housing formed with a box-type including a first wall, a second wall, a third wall, a fourth wall, and an upper side for deploying the airbag cushion,
   wherein the second wall and the fourth wall are faced to each other, and each of the second and fourth walls includes an extendable wall section, and
   wherein each of the extendable wall sections is in a folded state prior to deployment of the airbag cushion, and in the folded state of the extendable wall sections, the upper side of the housing is opened.

6. The airbag module according to claim 5, wherein each of the extendable wall sections is in an extended state when the airbag cushion expands and deploys, and in the extended state of the extendable wall sections, a size of the opened upper side of the housing is increased.

7. The airbag module according to claim 6, wherein each of the extendable wall sections is formed with a triangular shape and folded in half prior to deployment of the airbag cushion.

8. The airbag module according to claim 6, wherein each of the extendable wall sections is formed with a bellows type.

\* \* \* \* \*